(12) United States Patent
Sampson

(10) Patent No.: US 6,477,975 B2
(45) Date of Patent: Nov. 12, 2002

(54) MULTI-ADJUSTABLE SHOCK ABSORBER FOR WATER SKIING

(76) Inventor: James D. Sampson, P.O. Box 411, Washington, UT (US) 84780

( * ) Notice: Subject to any disclaimer, the term of this patent is extended or adjusted under 35 U.S.C. 154(b) by 0 days.

(21) Appl. No.: 09/751,904

(22) Filed: Dec. 30, 2000

(65) Prior Publication Data

US 2001/0047746 A1 Dec. 6, 2001

Related U.S. Application Data

(60) Provisional application No. 60/174,149, filed on Dec. 31, 1999.

(51) Int. Cl.$^7$ .............................................. B63B 21/04
(52) U.S. Cl. ......................................... 114/253; 441/69
(58) Field of Search .................................. 114/253, 254; 441/69

(56) References Cited

U.S. PATENT DOCUMENTS

| 4,975,543 A | 12/1990 | Saunders ...................... 174/69 |
| 4,992,629 A | 2/1991 | Morias ........................ 174/69 |

Primary Examiner—Jesus D. Sotelo

(57) ABSTRACT

A shock absorber for water-skiing 59 provides multiple adjustments to the adjacent cores 14 of the duplex core 15, and a weave assembly 29 securing a multipurpose assembly 48 in the cavity thereof, and provides attachment means 40,45 for use between the boat and the tow line assembly. In addition, the pneumatic duplex core 15 provides emergency floatation properties.

4 Claims, 4 Drawing Sheets

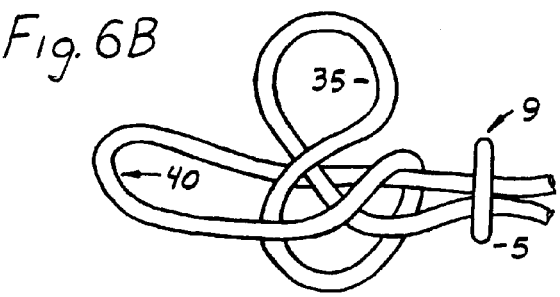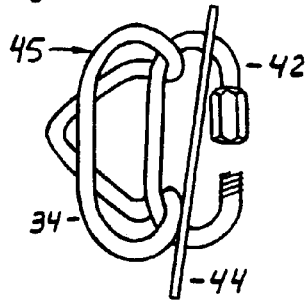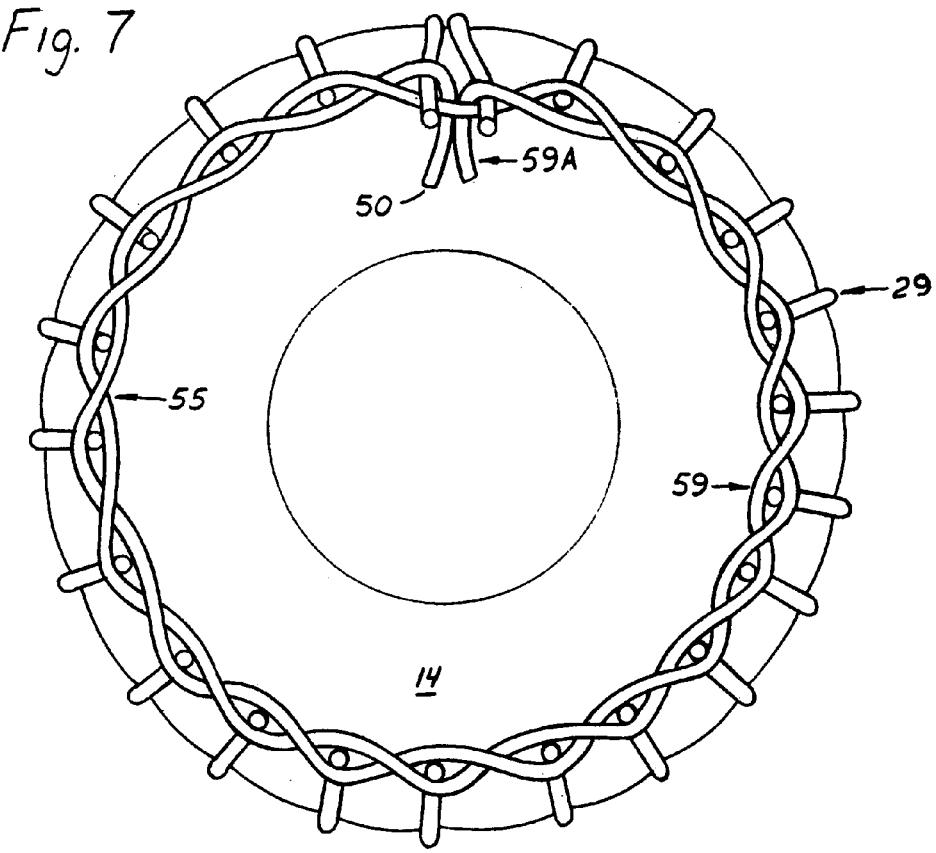

MULTI-ADJUSTABLE SHOCK ABSORBER FOR WATER SKIING

CROSS-REFERENCE TO RELATED APPLICATIONS

This application claims the benefit of Provisional Patent Application Ser. No. 60/174,149 filed Dec. 31, 1999.

BACKGROUND—FIELD OF INVENTION

This invention relates to tow line shock absorbers, specifically to an adjustable, self-contained travel length mechanism for a towed object including a water-skier.

BACKGROUND

Presently a person engaged in the sport of water-skiing is subject to excessive human fatigue, and normal human fatigue comprised of inadvertent and erroneous factors. Excessive fatigue is a result of the application and/or combination of technological advances found in the three components of the sport; (a) tow vessel "boat", (b) water ski(s), (c) rigging assembly "tow line". Normal fatigue is a limiting, factor for experienced skiers due to the requirements of the spot and inadvertent and erroneous factors increase normal human fatigue of a skier using contemporary equipment and configuration. Slalom style water-skiing utilizes a single ski that is fashioned to provide a decreased planing area, and proportionally increases human fatigue as compared to the use of a double ski configuration.

Heretofore, a skier is commonly tethered to the boat with a non-stretch or low-stretch tow line, inturn, the skier is directly linked to the boat, whereby, achieving the desired tow characteristics of direct linkage of all tow force to the skier while under tow. The skier is normally fatigued and must wear gloves to counteract the effects of the applied force.

Originally, the three components of water-skiing were the products of limited technology:

(a) The boat had reduced performance with large wooden hull construction and handling limitations. This style of boat provided a smooth progression of power to the skier for launching and skiing.

(b) The water ski(s) were constructed of large wooden laminates. This style of ski offered a large surface area for ease of skiing and reduced handling performance.

(c) The tow line was constructed of woven cotton, and performance was lessened and eased because the cotton weave would tend to stretch under excessive loading.

Thereafter, technological advances have refined these components of water-skiing to contemporary/common use:

(a) Boats offer increased performance with smaller and lighter fiberglass hull construction and improved handling. This boat provides a quick progression of power to the skier for launching and skiing.

(b) The water skis are constructed of materials such as fiberglass laminate and carbon fiber composite. This ski offers a smaller surface area for increased maneuverability and handling.

(c) The tow lines are constructed of either low-stretch or non-stretch materials, and provide improved performance.

Although technological advances have improved these three components of waterskiing, yet there are disadvantages to each component:

(a) Boats embody a V-8 engine with fuel injection and electronic ignition, and allows for excessive force application, and increased maneuverability may not allow the pilot to maintain a accurate tow.

(b) Water skis are very quick and responsive, and may permit the skier to surpass the speed of the boat during advanced maneuvers, or the skier may loose control due to the responsiveness of the ski(s).

(c) tow lines are constructed of non-stretch or low-stretch materials. Direct linkage to the boat will fatigue the skier during normal activity, and if slack is introduced into the tow line by inadvertant or erroneous factors. Slack removal requires technique of the skier, and technique is required to maintain a taunt tow line during normal use. The skier must absorb the force of the sudden reapplication of force as delivered as a result of slack in the tow line.

Furthermore, fatigue is the result of inadvertent and erroneous factors combined with the application of the three contemporary components during normal sport activities, including; (d) ambient condition factors, (e) the "deep-water" launch process, (f) advanced maneuvering by the skier, (g) erroneous maneuvering by the skier or the boat driver. The ramifications of these activities are:

(d) Ambient conditions causes inadvertant slack in the tow line.

(e) Deep-water launch of the skier from a partially submerged static position causes inadvertant fatigue.

(f) Advanced skiing maneuvering causes erroneous slack in the tow line.

(g) Erroneous maneuvering by the skier or the boat driver causes slack in the tow line.

Inadvertent or erroneous slack in the tow line fatigues the skier. Tow line slack is a result of removal of the tow force in relation to the skier, and fatigue is encountered during the reapplication of tow force, for a slacked tow line slows a skier in relation to the boat, and the instantaneous reapplication of tow force "hit" must be compensated for by the technique of the skier. The force of the hit is proportional to the speed of the boat and the decreased speed of the skier, and a hit of excessive magnitude can force the towline handle from the grip of the skier. Loss of the tow line handle results in the skier losing all momentum, and the skier becomes a hazard to other boaters until the boat returns to the partially submerged skier. The boat upon returning to the partially submerged skier re-establishes the tow line to the skier and a deep-water launch is attempted. A deep-water launch pulls the skier from a partially submerged position to a planning platform within 4 seconds, and hazards continue to exist to other boat traffic during the attempt(s) to launch the skier.

OBJECTIVES AND ADVANTAGES

Accordingly, this present invention performs of dispensing exponentially cushioned rigging legnth upon demand from the static position to either or both acting force(s), and then subsequently recoils the rigging legnth to the static position after demand is removed; whereby, several objects and advantages are:

a) to provide a duplex shock absorber which retains excessive tow force as applied from the boat;

b) to provide a duplex shock absorber which buffers the tow versus drag relationship;

c) a to provide a duplex shock absorber which eliminates direct tow line linkage;

d) to provide a duplex shock absorber which can compensate for ambient conditions;

e) to provide a duplex shock absorber which retains excess tow force;

f) to provide a duplex shock absorber which removes excess tow line slack;

g) to provide a duplex shock absorber which buffers the tow line.

Further objects and advantages are to provide a multi-adjustable shock absorber, permitting user adjustments to compensate for the weight and ability of the skier, and provide separate adjustments to effect the cushioning for the power of the boat and adjust the cushioning as felt by the skier.

DRAWING FIGURES

FIG. 6B, 6C details the opposing gathers and fastening assemblies as taken from the multipurpose assembly, yet not tethered.

Figure 1:
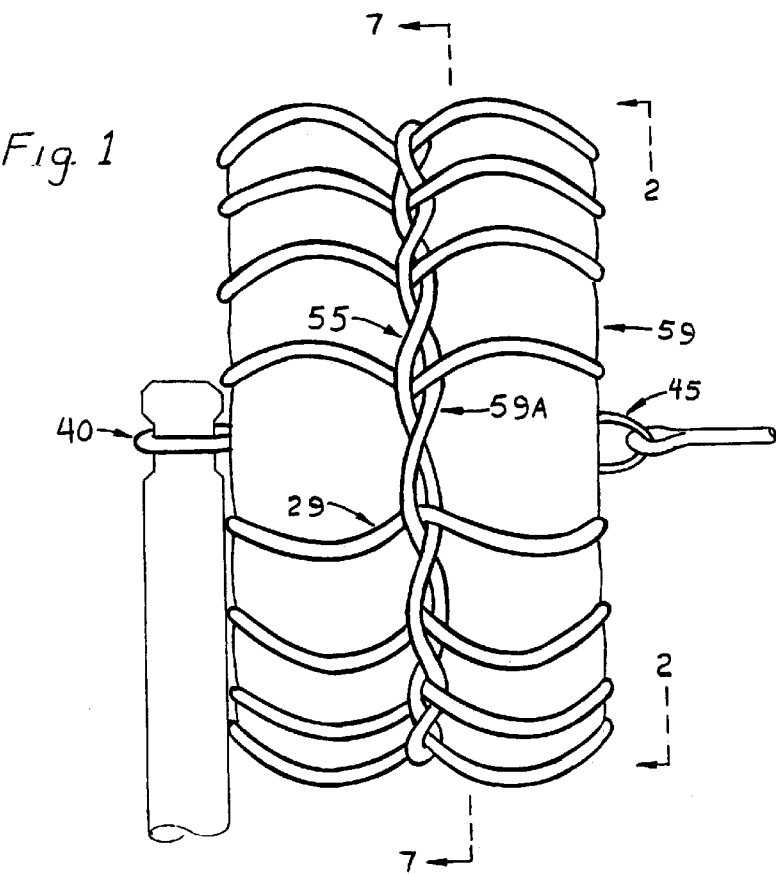
FIG. 1 shows a side view of the duplex shock absorber as positioned for use between the boat pylon and the tow line assembly.

FIG. 7 shows a view along line 7 of FIG. 1, illustrating a means of retaining, spacing and tensioning the weave assembly.

DESCRIPTION

FIG. 1 shows a side view of a preferred embodiment of a type of adjustable duplex shock absorber assembly 59 employed between the existing boat pylon and the tow line as presently used. The shock absorber assembly 59 is affixed to the pylon by means of the embodied main pull loop assembly 40 and provides an opposing main pull link assembly 45 that secures the tow line. These opposing main pull fastening means are embodied in the basic duplex shock absorber assembly 59. The weave assembly 29A is held in place by means of an outside diameter spacer 55 about the circumference of the duplex shock absorber 59, inturn providing a tensioning adjustment 59A for the weave assembly as detailed in FIG. 7.

Figure 2:
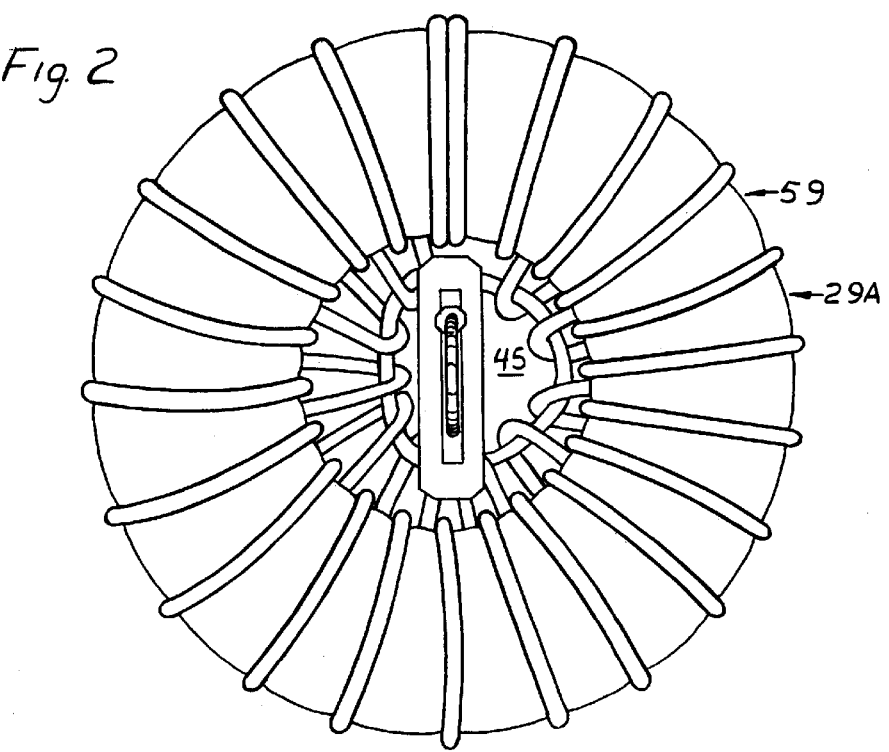
FIG. 2 shows an end view along line 2 of FIG. 1 using a preferred weave style, the view is of limited depth for illustration purposes.

FIG. 2 illustrates an end view of the shock absorber assembly 59 viewed along line 2 of FIG. 1 comprised of a type of meshed weave assembly 29A fashioned to retain the main pull link assembly 45 as detailed in FIG. 6C.

Figure 3:
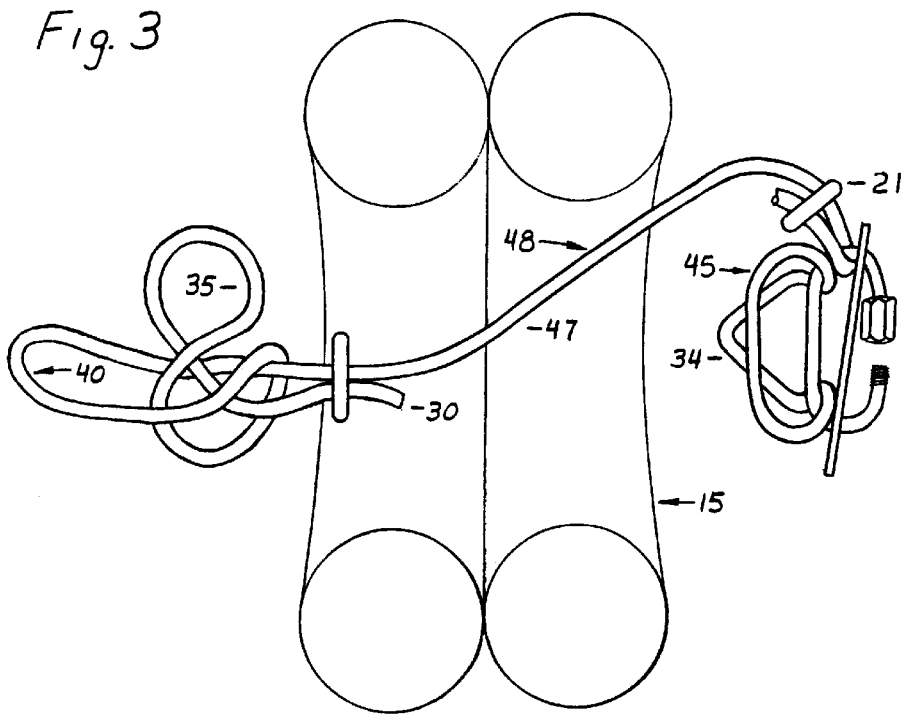
FIG. 3 shows a cross section view as positioned in FIG. 1, and illustrates the details of the embodied multipurpose assembly providing opposing gathers.
Figure 5:
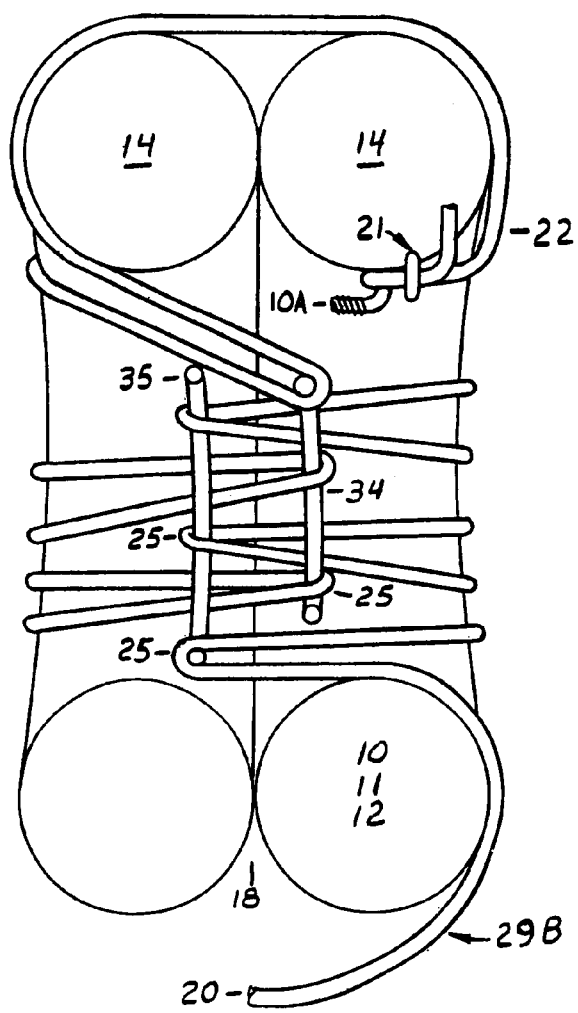
FIG. 5 shows a cross section view as positioned in FIG. 3 illustrating the opposing gathers of the partially illustrated multipurpose assembly as detailed in FIG. 3 replaced by an alternate weave style also illustrated in FIG. 4.

FIG. 3 is a cross section view of the core assembly 15 as detailed in FIG. 5. The multipurpose assembly 48 is comprised of the main pull loop assembly 40 including a safety tether 47 fashioned by a continued legnth of the employed rigging material 30 and secured to the main pull link assembly 45 by means of the fastener 21. The main pull loop assembly 40 embodies a gather 35 as detailed in FIG. 6B.

Figure 4:
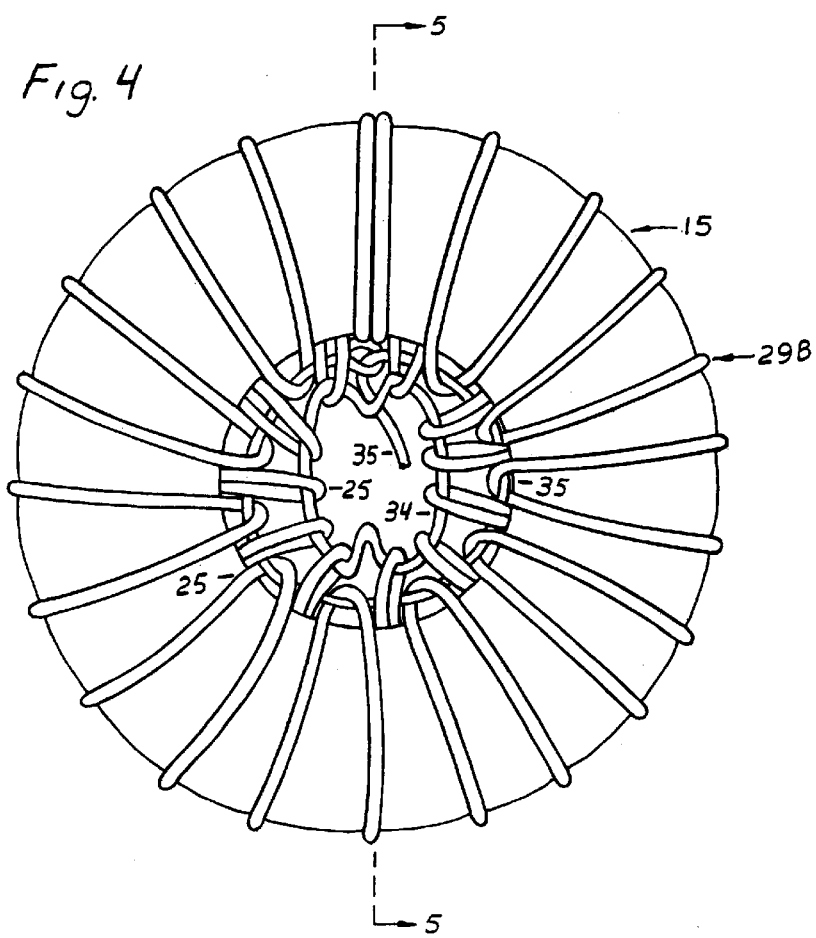
FIG. 4 shows an end view similar to FIG. 2, whereby the main pull link of FIG. 6A has been removed to illustrate the hub assembly retained by the weave therein.

FIG. 4 illustrates the opposing hub assemblies comprised of a one-piece gather 34 and an opposing gather 35. The opposing gathers retain the juxtaposed opposing ogive pull points 25 as produced by the type of weave assembly 29 about the core assembly 15.

FIG. 5 is a sectional view along line 5 of FIG. 4 illustrating the weave assembly 29B about the said gather 35 and the opposing one-piece gather 34, inturn producing juxtaposed hub assemblies of opposing ogive pull points 25 as formed by the weave assembly about the common plane 18. The weave assembly 29B and the weave assembly 29A in FIG. 2 are comprised of rigging materials such as kevlar or nylon core rope with nylon cover or 2-ply webbing or the like. Rigging 20 is fashioned to loop 22 and secured by compression fastener 21 to fit about the embodied valve stem 10A. The pneumatic body 10 is comprised of EPDM rubber inner-tube style with embodied valve stem 10A. The core assembly 15 produces a common plane 18 between each pneumatic body 14 after being stacked. Each EPDM pneumatic body assembly 14 comprises a pneumatic body 10 with the embodied valve stem 10A inflated with gaseous means 12 and may contain a type of sealer 11 to retard leakage through the EPDM wall of the pneumatic body 10.

Figure 6A:
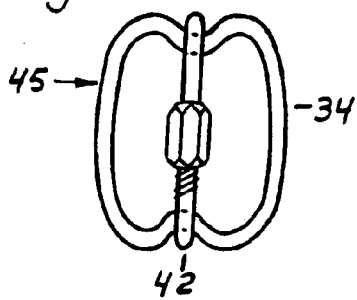
FIG. 6A shows an end view as positioned in FIG. 2, and details the main pull link and gather as a partial illustration of the multipurpose assembly.

FIG. 6A shows a top view of the main pull link assembly 45 of a one-piece gather 34 positioned in the main pull link 42.

FIG. 6B illustrates the main pull loop assembly 40 with gather 35. This main pull loop assembly 40 is comprised of rigging material similar to 20, yet may be of smaller stock diameter, and a compression fastener is employed to terminate the assembly, or secure the assembly to the said safety tether 47 as illustrated in FIG. 3. The compression assembly 9 is comprised of a metallic fastener 5 as positioned and secured by the appropriate compression tool.

FIG. 6C shows a side view of a main pull link assembly 45 comprising of the one piece gather 34 held under the embodied retainer of the main pull link 42, or a secondary retainer 44 may be employed comprised of hard plastic or metallic alloys, whereby the main pull link assembly 45 provides closure means after application of the tow line as illustrated in FIG. 1.

FIG. 7 illustrates the circumference spacer 55 as viewed along line 7 of FIG. 1. The spacer 55 retains the spacing of the said weave 29 about each core 14. The spacer 55 is comprised of rigging 50 similar to rigging 20, yet the employed variety may be of smaller stock diameter.

Additional adjustments may be made by altering the P.S.I. of either core 14 as required by the user to obtain custom results.

SUMMARY, RAMIFICATIONS AND SCOPE

Accordingly the reader will see that the multi-adjustable duplex shock absorber of this invention can be used to reduce human fatigue, and can be used to cushion the excess force applied to the user. In addition, the shock absorber may be adjusted in three ways, and permits the user to easily modify the responsiveness of the shock absorber. Furthermore, the duplex shock absorber separates and effects each opposing force independently and has additional advantages in that:

it permits removal of excess tow force as applied by the boat, and reduces fatigue.

it permits additional cushioned rigging or removal of slack in the tow line, and reduces fatigue.

it permits a buffered direct linkage to the skier through the pneumatic bodies, and adds cushioned rigging of excess force as applied, and reduces fatigue.

it compensates for ambient conditions and permits cushioning of the tow line, and reduces fatigue.

it permits advanced maneuvering by adding or removing cushioned rigging to the tow line, and reduces fatigue.

it compensates for erroneous maneuvers by adding or removing cushioned rigging to the tow line, and reduces fatigue.

it may be used as an emergency floatation devise due to its lightweight pneumatic design.

Although the descriptions above contain many specificities, these should not be construed as limiting the scope of the invention bit nearly providing illustrations of some of the presently preferred embodiments of the invention. For example, the duplex shock absorber can employ other rigging materials, fasteners, weaving styles of the rigging materials and methods of affixing the weave to the embodied gathers; the means of attaching to the boat may be modified to fit the specific hardware on various boats, and the tow line may be affixed directly to the respective hub assembly of ogive pull points about the gather, inturn, eliminating the main pull link.

Thus the scope of the invention should be determined by the appended claims and their legal equivalents rather than by the examples given.

I claim:

1. An adjustable shock absorber for use in water-skiing, wherein said shock absorber is connected to a tow boat and a tow line extends from said shock absorber to a water-skier, said shock absorber comprising first and second resilient, substantially toroidal-shaped members, said toroidal-shaped members being oriented alongside each other so that said toroidal-shaped members are substantially coaxial with each other and opposed sides of said toroidal-shaped members make abutting contact with each other in a common plane between said toroidal-shaped members;

means for securing said toroidal-shaped members in engagement with each other in their side-by-side, substantially coaxial position;

a first hub positioned on the same side of said common plane as said first toroidal-shaped member;

a second hub positioned on the same side of said common plane as said second toroidal-shaped member;

means for securing said first hub to said second toroidal-shaped member so that tension exerted on said first hub in a direction away from said second toroidal-shaped member will be distributed substantially equally around a side of said second toroidal-shaped member that does not abut said first toroidal-shaped member;

means for securing said second hub to said first toroidal-shaped member so that tension exerted on said second hub in a direction away from said first toroidal-shaped member will be distributed substantially equally around a side of said first toroidal-shaped member that does not abut said second toroidal-shaped member;

means for attaching a tow line to one of said first and second hubs; and means for connecting the other of said first and second hubs that is not attached to said tow line to a tow boat, whereby when a water-skier is being towed, tension is exerted through the tow rope to a hub of said shock absorber and to the corresponding toroidal-shaped member, with the other toroidal-shaped member sustaining tension from the other hub from the boat, so that the two toroidal-shaped members can be compressed and relaxed to allow extension and retraction of the tow rope from said shock absorber in response to the dynamic motion of the water-skier.

2. The adjustable shock absorber in accordance with claim 1 wherein a web member is provided to accomplish all three functions of said means for securing said toroidal-shaped members in engagement with each other, said means for securing said first hub to said second toroidal-shaped member and said means for securing said second hub to said first toroidal-shaped member, said web member comprising a length of inextensible rope-like material that crisscrosses back and forth around the outer periphery of said toroidal-shaped members extending back and forth in numerous, radial paths from said first hub around the outer periphery of said toroidal-shaped members to said second hub and back from said second hub around the outer periphery of said toroidal-shaped members to said first hub, with the numerous paths being sufficient to form a web that encircles the perimeters of said toroidal-shaped members and binds the toroidal-shaped members together in their side-by-side arrangement.

3. The adjustable shock absorber in accordance with claim 2 wherein said toroidal-shaped members are pneumatically inflated tubes.

4. The adjustable shock absorber in accordance with claim 1 wherein said toroidal-shaped members are pneumatically inflated tubes.

* * * * *